(12) United States Patent
Namou et al.

(10) Patent No.: US 9,136,705 B2
(45) Date of Patent: Sep. 15, 2015

(54) SCALABLE METHOD OF PROPORTIONAL ACTIVE STATE OF CHARGE BALANCING FOR MANAGING VARIATIONS IN THE STATE OF HEALTH OF BATTERIES

(75) Inventors: Andrew J. Namou, Southfield, MI (US); Christopher A. Schlaupitz, White Lake, MI (US); Todd F. Mackintosh, Macomb, MI (US); John Reed, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 734 days.

(21) Appl. No.: 13/163,138

(22) Filed: Jun. 17, 2011

(65) Prior Publication Data

US 2012/0319652 A1    Dec. 20, 2012

(51) Int. Cl.
*H02J 7/00* (2006.01)
*H02J 1/10* (2006.01)

(52) U.S. Cl.
CPC ............... *H02J 1/108* (2013.01); *H02J 7/0014* (2013.01); *H02J 2007/0067* (2013.01); *Y02T 10/7055* (2013.01)

(58) Field of Classification Search
CPC ........ H02J 1/108; H02J 7/0014; H02J 7/0019
USPC ........................................................ 320/125
See application file for complete search history.

(56) References Cited

U.S. PATENT DOCUMENTS

| | | | |
|---|---|---|---|
| 7,405,526 B2* | 7/2008 | Sato | 318/139 |
| 8,143,856 B2* | 3/2012 | Andrea et al. | 320/128 |
| 2010/0121511 A1* | 5/2010 | Onnerud et al. | 701/22 |
| 2010/0213897 A1* | 8/2010 | Tse | 320/116 |
| 2010/0244781 A1* | 9/2010 | Kramer et al. | 320/162 |
| 2010/0305770 A1* | 12/2010 | Bhowmik et al. | 700/295 |
| 2011/0084663 A1* | 4/2011 | Troxel et al. | 320/118 |
| 2012/0293129 A1* | 11/2012 | Naghshtabrizi et al. | 320/118 |
| 2013/0026843 A1* | 1/2013 | Arditi et al. | 307/82 |
| 2013/0221753 A1* | 8/2013 | Perreault et al. | 307/77 |

OTHER PUBLICATIONS

Yao-Ching Hsieh; Chou, S.P.; Moo, C.S., "Balance discharging for series-connected batteries," Power Electronics Specialists Conference, 2004. PESC 04. 2004 IEEE 35th Annual, pp. 2697-2702 vol. 4, 2004.*

(Continued)

*Primary Examiner* — Richard Isla Rodas
*Assistant Examiner* — David V Henze-Gongola
(74) *Attorney, Agent, or Firm* — John A. Miller; Miller IP Group, PLC

(57) ABSTRACT

A method and system for power management among batteries of varying states of health. Two or more battery packs are switched on and off in square wave pulses to energize a multi-winding transformer, and the output of the transformer is used to power a load. As the state of charge of the battery packs decrease at different rates, the duty cycle of each battery pack's switch pulse is made proportional to its state of charge relative to the other battery packs. The battery pack with the greatest state of charge has the longest on-time and provides the most energy to the transformer, yet all battery packs contribute. A baseline duty cycle is computed by a proportional integral control module, based on voltage measurements at the load. Energy contribution is managed so that state of charge does not diverge even when the battery packs have widely varying states of health.

14 Claims, 4 Drawing Sheets

(56) References Cited

OTHER PUBLICATIONS

American Electric Power, Functional Specification for Community Energy Storage (CES) Unit, Specification, Revision 2.1 Jul. 29, 2009 pp. 1-41.

Kamath Haresh, Lithium Ion Batteries for Electric Transportation: Costs and Markets, EPRI (Electric Power Research Institute) Sep. 22, 2009 pp. 1-22.

Hsieh Yao C. Balance Discharging for Series-Connected Batteries, 35th Annual IEEE, 2004, pp. 2697-2702.

Cready Erin, Technical and Economic Feasibility of Applying Used EV Batteries in Stationary Applications, A study for the DOE Energy Storage Systems Program, SAND Report, SAND2002-4084 printed Mar. 2003, pp. 1-130.

Moore Stephen W. A Review of Cell Equalization Methods for Lithium Ion and Lithium Polymer Battery Systems, Ociety of Automotive Engineers, INC Jan. 2001.

Bentley W. F. Cell Balancing Considerations for Lithium-Ion Battery Systems, IEEE 1997 pp. 223-226.

\* cited by examiner

SCALABLE METHOD OF PROPORTIONAL ACTIVE STATE OF CHARGE BALANCING FOR MANAGING VARIATIONS IN THE STATE OF HEALTH OF BATTERIES

BACKGROUND OF THE INVENTION

1. Field of the Invention

This invention relates generally to state of charge (SOC) balancing among battery packs and, more particularly, to a method and system for power management among battery packs with varying states of health which uses a switched transformer to provide proportional active SOC balancing.

2. Discussion of the Related Art

Electric vehicles and engine/electric hybrid vehicles are rapidly gaining popularity in today's automotive marketplace. Electric and hybrid vehicles offer several desirable features, such as reduced emissions, reduced usage of petroleum-based fuels, and potentially lower operating costs. A key component of both electric and hybrid vehicles is the battery pack. Battery packs in these vehicles typically consist of numerous interconnected cells, which can deliver a lot of power on demand to drive the vehicle.

After a few years of service in an electric or hybrid vehicle, battery packs often need to be replaced due to degradation and variation in the state of health of the individual cells, which leads to reduced driving range for the vehicle. Yet, even with a somewhat reduced state of health, an electric vehicle battery pack can still store a considerable amount of energy, and can be used for other applications besides powering a vehicle. A variety of different post-vehicle-life uses for such battery packs have been proposed, including using the battery packs in Community Energy Storage (CES) systems.

CES systems store energy for a small community, such as a residential subdivision or a commercial or industrial complex. CES systems typically serve to augment power available from the utility grid, and are useful in their ability to store locally-generated energy from sources such as solar and wind. Post-vehicle-life battery packs from electric vehicles can be used in CES systems, but their efficiency may be diminished by variations in the state of health of individual cells or sections of the battery packs. A method of managing variations in battery state of health is needed which does not simply bleed off power from higher state of charge batteries, and which enables use of maximum available energy in the battery packs.

SUMMARY OF THE INVENTION

In accordance with the teachings of the present invention, a method and system are disclosed for power management among batteries of varying states of health. Two or more battery packs are switched on and off in square wave pulses to energize a multi-winding transformer, and the output of the transformer is used to power a load. As the state of charge of the battery packs decrease at different rates, the duty cycle of each battery pack's switch pulse is made proportional to its state of charge relative to the other battery packs. Thus, the battery pack with the greatest state of charge has the longest on-time cycle and provides the most energy to the transformer, yet all battery packs contribute. An overall baseline duty cycle is computed by a proportional integral control module, based on voltage measurements at the load. Energy contribution is managed so that state of charge does not diverge even when the battery packs have widely varying states of health.

Additional features of the present invention will become apparent from the following description and appended claims, taken in conjunction with the accompanying drawings.

BRIEF DESCRIPTION OF THE DRAWINGS

FIG. 4 is a graph showing how state of charge does not diverge when battery packs of different states of health are used in the power management system of FIG. 2.

DETAILED DESCRIPTION OF THE EMBODIMENTS

The following discussion of the embodiments of the invention directed to proportional active state of charge balancing for managing variations in the state of health of batteries is merely exemplary in nature, and is in no way intended to limit the invention or its applications or uses.

Electric vehicles and engine/electric hybrid vehicles (hereinafter described simply as electric vehicles) are becoming increasingly popular and viable as various enabling technologies improve. One factor that all such vehicles have in common is the need for a high-capacity battery pack for energy storage. All currently-known battery technologies exhibit degradation in performance over time. Specifically, the state of health of batteries declines over time, where the state of health can be defined as the ability of a battery to store energy. For example, if a battery cell is able to store 10 kilowatt-hours (kWh) of energy when new, after a few years in service in a vehicle, that same battery cell may only be able to store 6 kWh of energy. In this state, the battery cell would be considered to have a state of health of 60%. Similarly, battery packs comprised of many individual cells can be considered to have a diminished collective state of health.

Furthermore, the state of health degradation rate of individual cells in a battery pack varies by cell. Thus, after a few years of service, individual cells in a battery pack may have states of health ranging from 60% to 80%, or an even wider range. In such a situation, a battery pack would typically be replaced in an electric vehicle, so the vehicle driving range can be maintained at an acceptable level. The post-vehicle-life battery pack may no longer be suitable for use in an electric vehicle, but still retains considerable energy storage capability. In order to use such battery packs effectively, it would be beneficial to be able to manage energy flow in battery systems containing multiple battery packs with the expected range of states of health.

Figure 1:
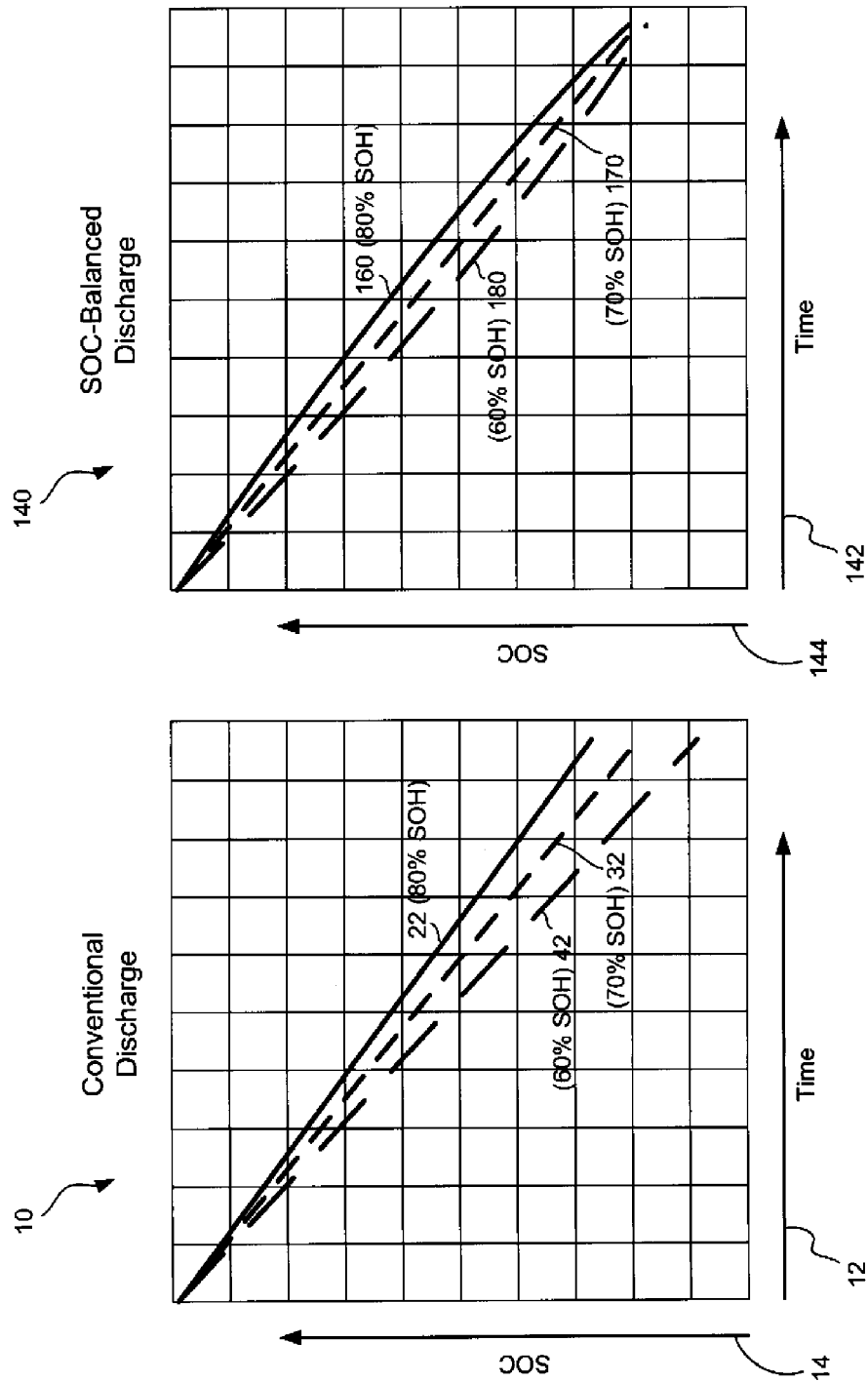
FIG. 1 is a graph showing how state of charge diverges when battery packs of different states of health are used conventionally to provide power.

FIG. 1 is a graph 10 showing how state of charge diverges when battery packs of different states of health are used conventionally to provide power. On the graph 10, horizontal axis 12 represents time, and vertical axis 14 represents state of charge. Curves 22, 32 and 42 show the state of charge of three different battery packs which are connected together, in a simple parallel connection for example, to power an appliance. In this example, consider that the first battery pack—represented by the curve 22—is at 80% state of health, the second battery pack—represented by the curve 32—is at 70% state of health, and the third battery pack—represented by the curve 42—is at 60% state of health. Each of the three battery packs can be charged to a state of charge equal to or near 100%, as shown at the top left of the graph 10. However, because the battery packs have different states of health, their states of charge will drop at different rates if each battery pack contributes the same amount of power to the appliance.

As can be seen on the graph 10, the curves 22, 32 and 42 diverge over time, as the first battery pack retains a higher state of charge than the second battery pack, which in turn retains a higher state of charge than the third battery pack. This situation can cause several problems, including differing voltages between the battery packs, and the need to recharge one battery pack before the others.

Some methods of dealing with battery packs of differing state of health or state of charge are known in the art. One such method is simple resistive balancing, where battery pack sections at a higher state of charge are discharged through a resistor and energy is burned off until all sections are at approximately the same state of charge. Another method is known as charge shuttling, where energy is transferred from higher state of charge sections to lower state of charge sections. And in yet another method, only the highest state of charge sections are available to provide energy until their state of charge drops to the value of other sections. However, all of these methods suffer from drawbacks—including waste of energy, and/or inability to provide maximum power and/or total available energy when state of charge is out of balance.

Figure 2:
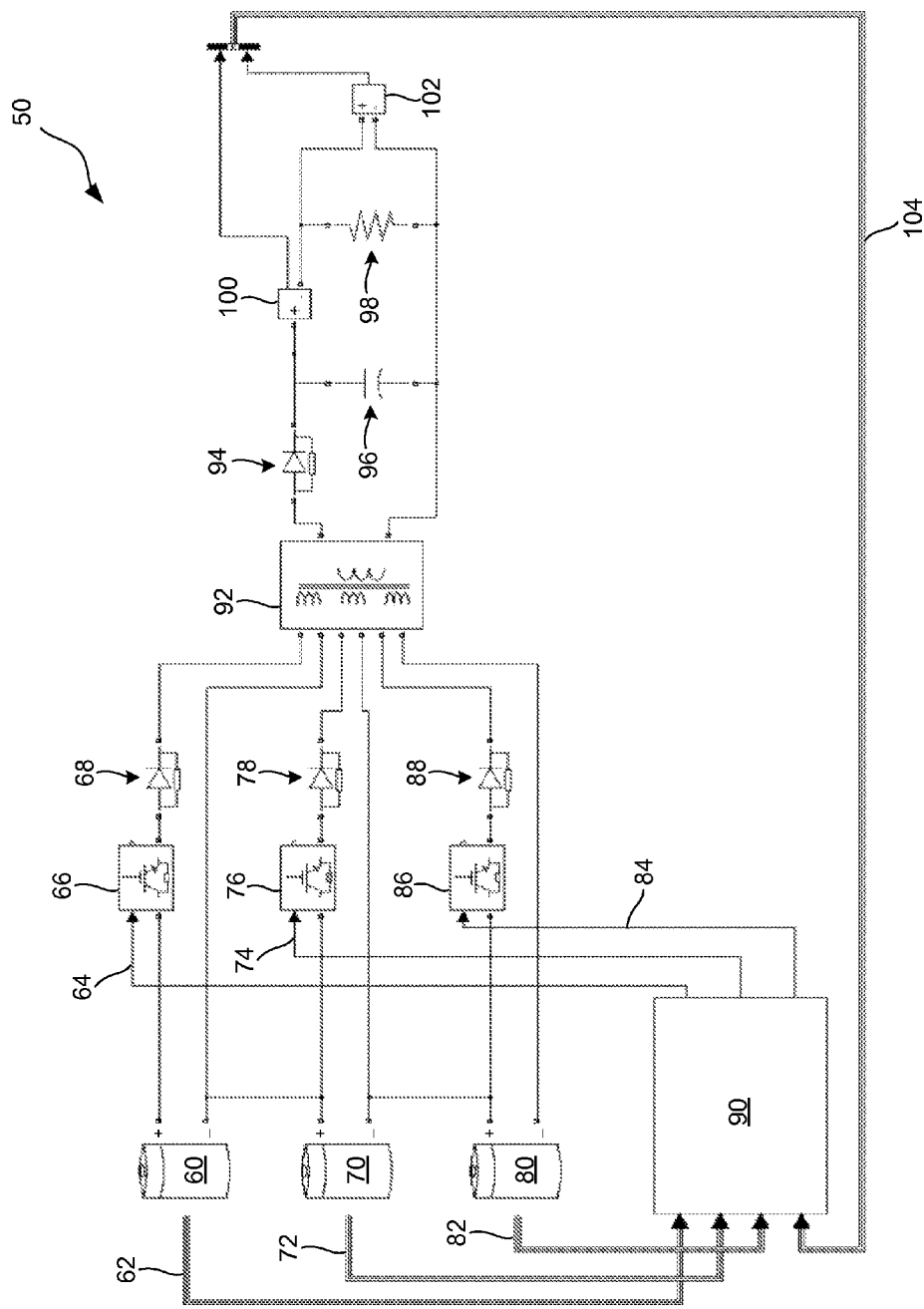
FIG. 2 is a schematic diagram of a power management system which uses proportional active state of charge balancing to modulate power delivery from battery packs with varying states of health.

FIG. 2 is a schematic diagram of a power management system 50 which uses proportional active state of charge balancing to modulate power delivery from battery packs with varying states of health. The power management system 50 includes battery packs 60, 70 and 80. It is noted that the system 50 could include more or fewer than three battery packs. Also, the term "battery pack" is used here generically; each of the battery packs 60, 70 and 80 could represent a section of an electric vehicle battery pack, or even an individual multi-cell battery. As will be discussed in detail, the system 50 can manage power delivery from battery packs of unequal states of health. For illustration purposes, consider that the battery pack 60 is at 80% state of health, the battery pack 70 is at 70% state of health, and the battery pack 80 is at 60% state of health.

The system 50 includes a controller 90 for modulating power from the battery packs 60, 70 and 80. The operation of the controller 90 will be discussed in detail below. The state of charge of the battery pack 60 is measured and provided to the controller 90 on line 62. Likewise, the state of charge of the battery packs 70 and 80 are provided to the controller 90 on lines 72 and 82, respectively. Technology for measuring state of charge—through voltage measurement or other means—is known in the art and need not be discussed here.

The system 50 uses a multi-winding transformer 92 to convert power from the battery packs 60, 70 and 80 to usable power at a consistent voltage. Square wave signals are used to modulate the power from each battery pack to the transformer 92, with the duty cycle of the square wave from each battery pack being controlled by the controller 90 so that a consistent output voltage is maintained and the power provided by each battery pack is proportional to its state of charge relative to the other battery packs.

The controller 90 provides a square wave signal on line 64 to a switch 66 which switches the positive lead from the battery pack 60 on and off. Similarly, the controller 90 provides a square wave signal on line 74 to switch 76 which switches the positive lead from the battery pack 70, and a signal on line 84 to switch 86 which switches the positive lead from the battery pack 80. In one embodiment, the switches 66, 76 and 86 are insulated gate bipolar transistors (IGBTs), which are noted for high efficiency and moderately high switching capability. In this design, the square wave signal from the controller 90 on the line 64 is provided to the gate terminal of the switch 66, the positive lead from the battery pack 60 is connected to the collector terminal of the switch 66, and the output of the switch 66 at the emitter terminal connects to one terminal of the transformer 92 through a diode 68 which is used to prevent backflow current from the transformer 92. Other types of switches besides IGBTs, such as MOSFET switches, could also be used.

Thus, in order from top to bottom in FIG. 2, the inputs to the left or primary side of the transformer 92 are comprised of the switched positive lead from the battery pack 60 via the switch 66 and the diode 68, the negative lead from the battery pack 60, the switched positive lead from the battery pack 70 via the switch 76 and a diode 78, the negative lead from the battery pack 70, the switched positive lead from the battery pack 80 via the switch 86 and a diode 88, and the negative lead from the battery pack 80. The rapid switching on and off of the positive leads from the battery packs 60, 70 and 80 provides the excitation necessary for the transformer 92 to produce an output voltage.

On the right side of the transformer 92, the positive output from the secondary winding is passed through a rectifier diode 94, and a rectifier filter capacitor 96 is placed in parallel with a load 98. The load 98 could be any kind of appliance or appliances in need of a power source. A current meter 100 measures the current through the load 98, and a voltage meter 102 measures the voltage across the load 98. Data from the current meter 100 and the voltage meter 102 are provided as feedback to the controller 90 on line 104.

In one example, each of the battery packs 60, 70 and 80 could have a nominal voltage in the range of 100-150 volts dc, and the transformer output voltage at the load 98 could be about 600 volts dc. The design of the transformer 92 can be determined based upon the quantity and voltage of the battery packs 60, 70 and 80, and the target voltage at the load 98.

Figure 3:
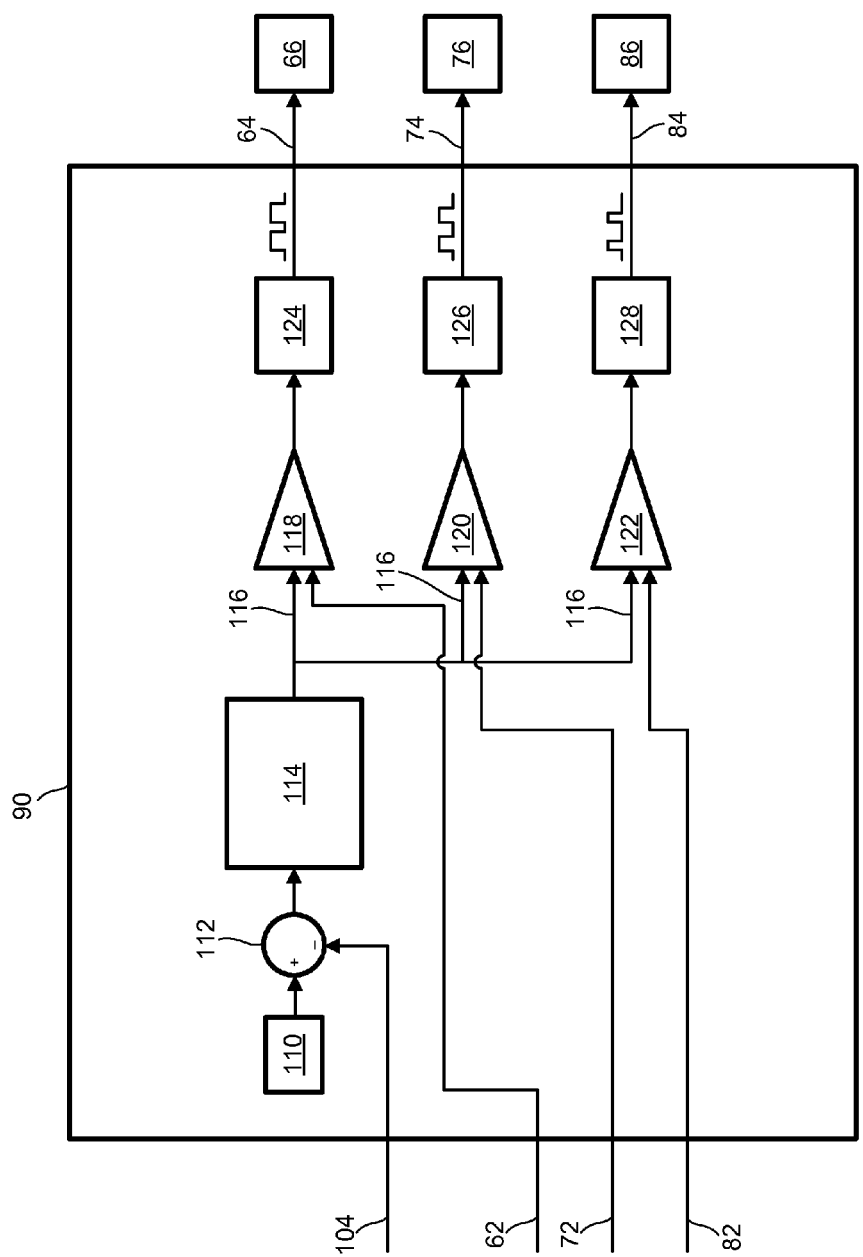
FIG. 3 is a schematic diagram of a controller used in the power management system of FIG. 2, including its inputs and outputs.

FIG. 3 is a schematic diagram of the controller 90, including its inputs and outputs. A target load voltage, such as 600 volts, is provided from box 110 to a summing junction 112. As described above, the line 104 provides voltage and current feedback to the controller 90. The voltage across the load 98 is provided on the line 104 to the summing junction 112, where it is subtracted from the target load voltage. The difference, or voltage error, is provided to a duty cycle control module 114. The duty cycle control module 114 computes a baseline duty cycle for the square wave pulses at the switches 66, 76 and 86, using a suitable control algorithm, such as a proportional-integral (PI) or proportional-integral-derivative (PID) algorithm. These algorithms are well known in the art, and provide control signals based on current error (proportional), accumulation of past error (integral), and prediction of future error based on rate of change (derivative).

The duty cycle control module 114 provides the baseline duty cycle on line 116 to each of three multiplier modules 118, 120 and 122. Each of the multiplier modules 118, 120 and 122 receives current state of charge information for one of the battery packs 60, 70 or 80, calculates the ratio of the state of charge of its battery pack to the state of charge of the battery pack with the highest state of charge, and multiplies the ratio by the baseline duty cycle.

For example, consider a situation where the baseline duty cycle is 75%, the current state of charge of the battery pack 60 is 86%, the current state of charge of the battery pack 70 is 83%, and the current state of charge of the battery pack 80 is 80%. The multiplier module 118 would receive the state of charge measurement for the battery pack 60 (86%) on the line 62, would divide the state of charge measurement by the highest state of charge measurement (also 86%), and multiply by the baseline duty cycle. Thus, the multiplier module 118 would compute a duty cycle for the battery pack 60 via the switch 66 of (0.86/0.86)*(0.75)=0.75, or 75% on-time.

Similarly, the multiplier module 120 would receive the state of charge measurement for the battery pack 70 (83%) on the line 72, would divide the state of charge measurement by the highest state of charge measurement (86%), and multiply by the baseline duty cycle. Thus, the multiplier module 120 would compute a duty cycle for the battery pack 70 via the switch 76 of (0.83/0.86)*(0.75)=0.724, or about 72% on-time. Finally, the multiplier module 122 would receive the state of charge measurement for the battery pack 80 (80%) on the line 82, would divide the state of charge measurement by the highest state of charge measurement (86%), and multiply by the baseline duty cycle. Thus, the multiplier module 122 would compute a duty cycle for the battery pack 80 via the switch 86 of (0.80/0.86)*(0.75)=0.698, or about 70% on-time.

The multiplier modules 118, 120 and 122 provide their duty cycle information to pulse generators 124, 126 and 128, respectively, which generate the appropriate square wave pulse signals. The pulse generator 124 provides its signal to the switch 66 on the line 64, while the pulse generator 126 provides its signal to the switch 76 on the line 74, and the pulse generator 128 provides its signal to the switch 86 on the line 84. The square wave signal traces are depicted (with differences exaggerated) just above the lines 64, 74 and 84 in FIG. 3. As described above, the duty cycle of the square wave pulses is determined by the demand of the load 98 and the relative battery pack states of charge. The frequency of the square wave pulses can be determined to optimize the performance of the overall power management system 50, including the performance of the transformer 92 and the switches 66, 76 and 86, along with power load transients. In a typical implementation, the square wave pulse frequency would be in a range from a few hundred Hertz (Hz, or cycles per second) up to 10-20 thousand Hz.

As the power management system 50 operates, if the voltage at the load 98 drops, the duty cycle control module 114 will increase the baseline duty cycle so that each of the switches 66, 76 and 86 experiences slightly greater on-time, thus increasing the output voltage from the transformer 92. Meanwhile, the multiplier modules 118, 120 and 122 continue to modulate the actual on-time of each switch in proportion to the state of charge of the battery pack which it switches. In this way, the controller 90 meets both objectives—maintaining a consistent output voltage, and balancing the power consumption from the battery packs of different states of health.

FIG. 4 is a graph 140 showing how state of charge does not diverge when battery packs of different states of health are used in the power management system 50. Again on the graph 140, horizontal axis 142 represents time, and vertical axis 144 represents state of charge. Curves 160, 170 and 180 show the state of charge of the three battery packs 60, 70 and 80, respectively, which are shown in FIG. 2. In a continuation of the example described above, consider that the battery pack 60 is at 80% state of health, the battery pack 70 is at 70% state of health, and the battery pack 80 is at 60% state of health. Each of the battery packs 60, 70 and 80 can be charged to a state of charge equal to or near 100%, as shown at the top left of the graph 140.

As observed previously on the graph 10, the state of charge of the three battery packs 60, 70 and 80 initially begins to separate as they discharge. In this case, however, as the state of charge difference grows, the controller 90 modulates the switch signals so that more power is delivered from the battery pack 60 than from the battery pack 70, while the battery pack 80 provides the least power. As can be seen on the graph 140, the curves 160, 170 and 180 then converge over time, as the controller 90 continues to modulate power based on the relative state of charge of each battery pack.

Figure 5:
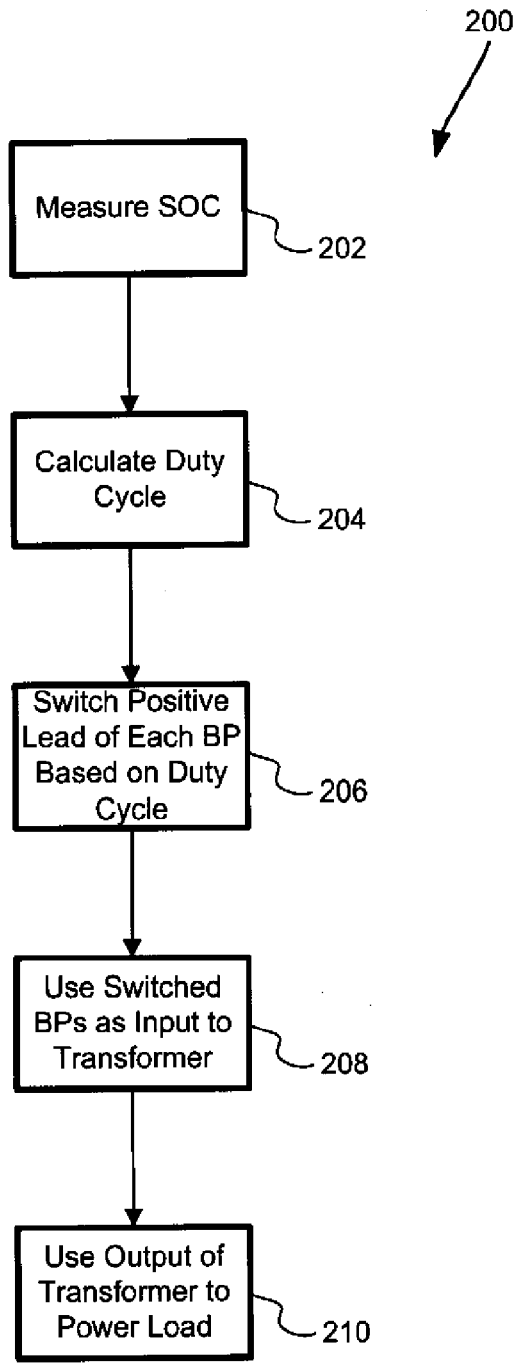
FIG. 5 is a flow chart diagram of a method for proportional active state of charge balancing among battery packs with varying states of health.

FIG. 5 is a flow chart diagram 200 of a method for proportional active state of charge balancing among battery packs with varying states of health. At box 202, state of charge is measured for two or more battery packs in a system. At box 204, a duty cycle is calculated for each of the battery packs in the system, where the duty cycle is a function of the state of charge for the battery pack, the highest state of charge for any battery pack in the system, and the power demand by a load on the system. At box 206, the positive lead of each battery pack is switched on an off in a square wave signal based on the battery pack's duty cycle as calculated at the box 204. At box 208, the switched positive leads and the negative leads of each battery pack are provided as energy input to a multi-winding transformer. At box 210, output from the multi-winding transformer is used to power the load on the system.

The proportional active state of charge balancing method and system described above can be used with battery packs of different chemistry (for example, nickel metal hydride or lithium ion), or battery packs of different energy storage capacity. The disclosed method and system are also scalable to different battery pack voltages and target load voltages, as the number of battery packs and the transformer windings can be designed to accommodate these variables.

The proportional active state of charge balancing method described above can also be used during battery pack charging. In a Community Energy Storage application, battery pack charging may be done using solar or wind energy, or charging may be done using energy from the electrical grid during off-peak hours when costs are lower. In any case, actively balancing charging and discharging based on the current state of charge of individual battery packs enables battery packs of different state of health, different capacity, and/or different chemistry to be used together in an energy storage system.

Using the techniques disclosed above, power can effectively be managed among battery packs with widely varying states of health, where all battery packs contribute energy throughout the discharge period. Such battery packs can therefore be used efficiently in CES systems or other energy storage applications. Furthermore, given a valuable post-vehicle-life usage scenario for electric vehicle battery packs, electric vehicle manufacturers can derive greater residual value from the battery packs after they are no longer suitable for electric vehicle use.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A power management system for delivering electrical power from two or more battery packs to a load, said power management system comprising:
   sensors for measuring a state of charge in each of the two or more battery packs;
   a switch positioned in a positive lead of each of the two or more battery packs, where each of the switches provides a switched power signal from one of the battery packs;
   a diode in series with each of the switches in the positive leads of the battery packs;
   a transformer responsive to the switched power signals from the two or more battery packs, said transformer receiving on primary windings the switched power signals from positive terminals of the battery packs, where each of the battery packs provides current to the transformer during each switch cycle, and where each of the switched power signals operates on a different duty cycle with different on-times and off-times, said transformer converting the switched power signals to an output voltage and an output current to power a load; and
   a controller responsive to state of charge signals from the sensors and configured to control the switched power signals from the two or more battery packs so that the output voltage at the load is maintained at a designated target value and the state of charge in each of the two or more battery packs is balanced, where the controller computes a duty cycle for each of the switched power signals as a baseline duty cycle multiplied by a ratio of the state of charge for each of the battery packs to a highest state of charge for all of the battery packs, and where the baseline duty cycle is a ratio of on-time to total cycle time, wherein the controller uses a proportional-integral algorithm to compute the baseline duty cycle.

2. The system of claim 1 wherein the two or more battery packs have different states of health, different storage capacities, or different chemistries.

3. The system of claim 1 wherein the switches are insulated gate bipolar transistors.

4. The system of claim 1 wherein the switched power signals are square wave pulses, where on-time and off-time periods of the pulses are calculated by the controller.

5. The system of claim 1 wherein the transformer is a multi-winding transformer.

6. The system of claim 1 wherein the baseline duty cycle is computed by comparing the output voltage at the load to the designated target value.

7. The system of claim 1 wherein the controller includes a proportional-integral duty cycle control module, a multiplier module for each of the two or more battery packs, and a pulse generator module for each of the two or more battery packs.

8. A power management system for delivering electrical power from two or more battery packs having different states of health, different storage capacities, or different chemistries to a load, said power management system comprising:
   sensors for measuring a state of charge in each of the two or more battery packs;
   a switch positioned in a positive lead of each of the two or more battery packs, where each of the switches provides a square wave pulse switched signal from one of the battery packs;
   a diode in series with each of the switches in the positive leads of the battery packs;
   a multi-winding transformer responsive to the square wave pulse switched signals from the two or more battery packs, said transformer receiving on primary windings the switched signals from positive terminals of the battery packs, where each of the battery packs provides current to the transformer during each switch cycle, and where each of the switched signals operates on a different duty cycle with different on-times and off-times, said transformer converting the switched signals to an output voltage and an output current to power a load;
   a rectifier circuit that converts the output voltage and the output current from the transformer to a direct current; and
   a controller responsive to state of charge signals from the sensors and configured to control the square wave pulse switched signals from the two or more battery packs so that the output voltage at the load is maintained at a designated target value and the state of charge in each of the two or more battery packs is balanced, where the controller computes a duty cycle for each of the square wave pulse switched signals as a baseline duty cycle multiplied by a ratio of the state of charge for each of the battery packs to a highest state of charge for all of the battery packs, and where the baseline duty cycle is computed by comparing the output voltage at the load to the designated target value, wherein the controller uses a proportional-integral algorithm to compute the baseline duty cycle.

9. The system of claim 8 wherein the switches are insulated gate bipolar transistors.

10. The system of claim 8 wherein the controller includes a proportional-integral duty cycle control module, a multiplier module for each of the two or more battery packs, and a pulse generator module for each of the two or more battery packs.

11. A method for providing state of charge balancing and power distribution for two or more battery packs, said method comprising:
   providing state of charge measurements of each of the two or more battery packs;
   calculating duty cycles for each of the two or more battery packs based on the state of charge measurements, including calculating a ratio of a battery pack's current state of charge to a highest value of all of the state of charge measurements, and multiplying the ratio by a baseline duty cycle, where the duty cycles designate on-time and off-time periods, and wherein the baseline duty cycle is calculated using a proportional-integral algorithm;
   switching each of the battery packs on and off according to the duty cycles to produce a switched power signal from a positive terminal of each of the battery packs;
   providing the switched power signal from the positive terminal of each of the battery packs, through a diode, to a primary winding of a transformer, where each of the battery packs provides current to the transformer during each switch cycle, and where each of the switched power signals operates on a different duty cycle with different on-times and off-times; and
   using voltage and current produced by a secondary winding of the transformer to power a load.

12. The method of claim 11 wherein the two or more battery packs have different states of health, different storage capacities, or different chemistries.

13. The method of claim 11 wherein the baseline duty cycle is calculated based on a voltage across the load compared to a target voltage.

14. The method of claim 11 wherein the switched power signal from each of the battery packs is a square wave signal.

* * * * *